United States Patent [19]

Walton et al.

[11] Patent Number: 4,532,961

[45] Date of Patent: Aug. 6, 1985

[54] BIDIRECTIONAL DISC THROTTLING VALVE

[75] Inventors: Herbert H. Walton; Steven D. Kehoe, both of Marshalltown, Iowa

[73] Assignee: Fisher Controls International, Inc., Marshalltown, Iowa

[21] Appl. No.: 443,704

[22] Filed: Nov. 22, 1982

[51] Int. Cl.³ .................. F16K 11/14; F16K 31/52
[52] U.S. Cl. .................. 137/625.31; 251/212; 251/175
[58] Field of Search .............. 251/212, 192, 175; 137/625.31

[56] References Cited

U.S. PATENT DOCUMENTS

| 1,592,471 | 7/1926 | Smolensky | 137/625.31 |
| 1,986,252 | 1/1935 | Conran | 251/163 |
| 2,177,937 | 10/1939 | Goldschmidt | 137/625.31 X |
| 2,614,789 | 10/1952 | Labour | 251/212 |
| 3,026,899 | 3/1962 | Mischanski | 137/375 |
| 3,068,891 | 12/1962 | Panning et al. | 251/212 X |
| 3,183,926 | 5/1965 | Boudot | 137/270 |
| 3,396,904 | 8/1968 | Janette | 230/114 |
| 3,426,797 | 2/1969 | Baker | 137/625.31 |
| 3,658,087 | 4/1972 | Nelson | 251/175 X |
| 3,696,831 | 10/1972 | Fowler et al. | 251/175 X |
| 3,880,402 | 4/1975 | Fleischer | 251/212 |
| 4,202,527 | 5/1980 | Price et al. | 251/58 |
| 4,300,724 | 11/1981 | Reynolds | 239/654 |

FOREIGN PATENT DOCUMENTS 267245  3/1927  United Kingdom ........... 137/625.31

OTHER PUBLICATIONS

Willis Oil Tool Co. Catalog.
Jordan Valve Catalog, TCV 7-75 Sliding Gate TM Temperature Regulator.

Primary Examiner—Arnold Rosenthal
Attorney, Agent, or Firm—Dale A. Kubly; Nicholas A. Camasto

[57] ABSTRACT

A high pressure bidirectional flow throttling valve includes a pair of rotatable throttling discs mounted in a cavity for slight lateral movement in the flowpath. The operating mechanism for rotating the discs includes a toggle arrangement located outside the flowpath.

7 Claims, 6 Drawing Figures

OPENED

CLOSED

BIDIRECTIONAL DISC THROTTLING VALVE

FIELD OF THE INVENTION

This invention relates generally to fluid control valves and particularly to fluid control valves of the throttling type.

BACKGROUND OF THE INVENTION AND PRIOR ART

Throttling type fluid control valves are characterized by their ability to precisely control, or meter, flow through their flow openings, or ports, such openings being generally adjustable in size. Such valves may be for high pressure or low pressure use, suitable for use with caustic fluids, gases, etc. The present invention is directed to throttling control valves which exhibit precise flow control, are suitable for use in high pressure flowpaths and possess high operating efficiency, that is, do not substantially impede flow when in the open position.

The throttling valve of the present invention is of the movable disc type and has a pair of machined, relatively adjustable throttling discs with corresponding ports. Movement of the discs relative to each other varies the size of the ports in the flowpath and thus controls fluid flow.

There are a number of different types of disc valves in the prior art, although many are unsuitable for use in high pressure flow lines. Those that are used in high pressure flow lines generally have a disc operating mechanism situated in the downstream side of the flow line to control the size of the port openings and hence, the fluid flow. Therefore, such mechanisms are generally of heavy construction to withstand the high pressure flow. One prior art valve has a stationary disc and a movable disc that is operated by a rotational fork that engages the disc periphery. In one version, the flowpath turns just downstream of the fork so that the operating mechanism for the fork is not in the flowpath. In another version, an operating handle protrudes from the side of the valve body to permit the operating mechanism to be out of the flowpath. The mechanism in both versions is massive, quite complicated to manufacture and assemble and appears to be quite expensive.

Prior art disc type throttling valves for high pressure applications are also unidirectional, usually having one fixed disc and one movable disc which is generally movably mounted to the fixed disc at its axis. They often use the flowpath pressure to help provide a seal. They are not suitable for use in bidirectional flowpaths and, unless of expensive construction, are not generally useful in high pressure flowpaths.

OBJECTS OF THE INVENTION

The principal object of this invention is to provide an improved disc type throttling valve.

A further object of this invention is to provide an improved disc type throttling valve which is economical to manufacture and capable of use with a wide variety of fluids or gases in high pressure flowpaths.

A still further object of this invention is to provide a disc type throttling valve capable of use in bidirectional high pressure flowpaths.

A feature of this invention resides in the ease of reversibility of the discs to enable a given operating motion to either open or close the valve.

SUMMARY OF THE INVENTION

In accordance with the invention a throttling valve comprises a body defining a cavity, a pair of discs defining ports positioned for relative movement in a flowpath for varying the relationship between the ports, operating means outside the flowpath for effecting relative movement of the discs, and means for mounting the discs in the cavity for slight movement in the direction of the flowpath.

BRIEF DESCRIPTION OF THE DRAWINGS

Further objects, advantages and features of the invention will be apparent upon reading the following description thereof in conjunction with the drawings in which.

DESCRIPTION OF THE PREFERRED EMBODIMENT

Figure 1:
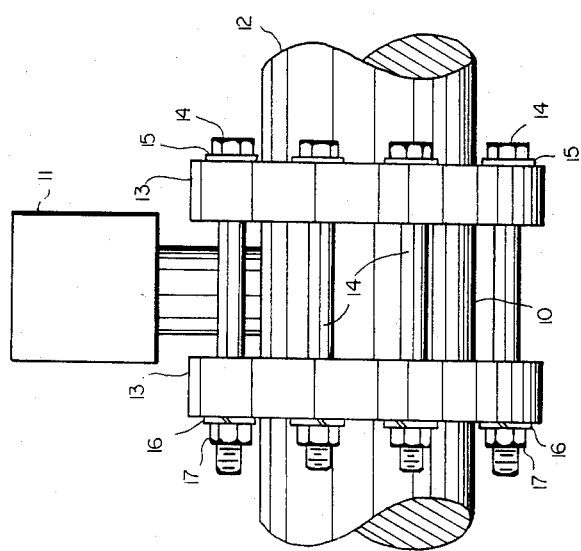
FIG. 1 is a block type representation of the throttling valve of the present invention mounted in a flow line defining a flowpath.

Referring to FIG. 1, a throttling valve 10, actuatable by an actuator 11, is coupled to a pipeline 12 by means of a pair of flanges 13 mounted to the pipeline and held together by a plurality of bolts 14. A washer 15 may be positioned between the head of each bolt and one flange. The fastening, or line bolting as it is commonly referred to, may be completed by means of a suitable lock washer 16 and nut 17 affixed to the other end of each bolt 14. It will be appreciated that the illustration is diagrammatic only since the flanges and mechanisms for securing the throttling valve between the flanges are conventional and a matter of choice or preference of the designer.

Figure 2:
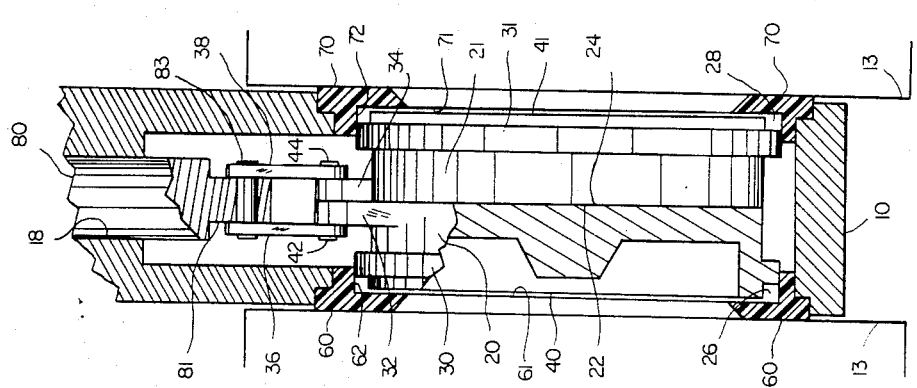
FIG. 2 is a partial sectional view of a throttling valve in accordance with the present invention.
Figure 4:
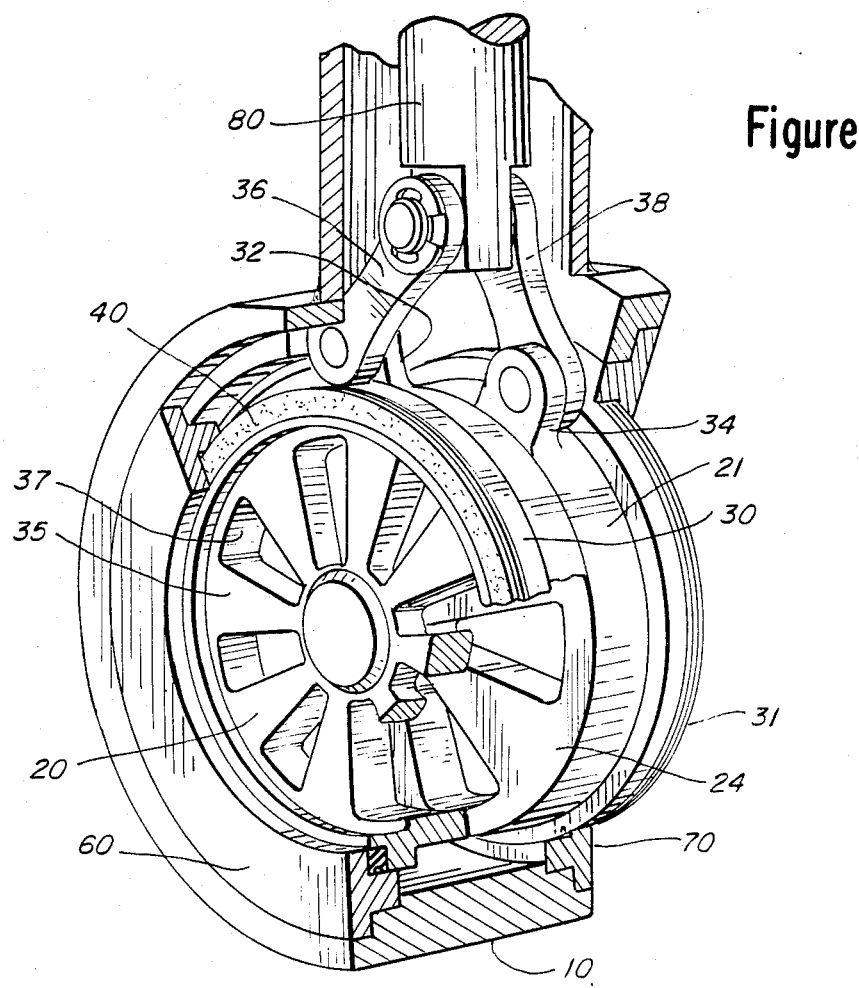
FIG. 4 is a partially broken away perspective of an assembled valve to better illustrate its operation.

FIG. 2 represents a cross section taken through the throttling valve of the present invention illustrating the position and arrangement of the throttling discs within the valve body and the operating mechanism for producing the desired throttling movement. This FIG. 2 may be advantageously considered with the perspective view of FIG. 4 to more readily visualize the construction, arrangement and operation of the valve. Specifically, throttling discs 20 and 21 (shown in FIG. 2 in end view with disc 20 partially broken away) are positioned with their inner faces 22 and 24 in intimate contact with each other. The discs are substantially circular in shape and have polished inner faces adapted for rotatably sliding over each other. The discs are not connected to each other and include respective parts for producing throttling actions of the valve when the discs are rotated. The throttling discs may be constructed of metal or other suitable material depending on the intended use and operating environment.

The operating mechanism for the discs is outside the flow-path thus rendering the valve eminently suitable for high pressure operation. More particularly, discs 20 and 21 include integral drive elements comprising ears 32 and 34 enabling rotation of the discs by the operating mechanism. The ears are connected via toggle links 36 and 38 to a flat-sided depending portion 81 at the bottom of an operating stem 80 of the actuator. The stem 80 slides up and down in a bore 18 through the actuator and may include conventional packing means (not shown) to prevent leakage. A cylindrical pin 83 pivotally retains suitably apertured toggle links 36 and 38 to opposite sides of portion 81 on the bottom of the stem. Similarly, short pins 42 and 44 connect the other ends of the toggle links to ears 32 and 34, respectively.

The body of valve 10 defines a cavity in which throttling discs 20 and 21 are retained. The preferred means for retention of the discs in the body is a pair of end rings 60 and 70. The end rings include end sealing surfaces 61 and 71 which cooperate with outer faces 40 and 41 of the throttling discs, respectively to form a seal between the downstream disc and end ring. The discs also include annular ridges 30 and 31 which ride on smooth inner annular surfaces 62 and 72 in end rings 60 and 70, respectively. These surfaces comprise bearing means for enabling slight movements of the disc laterally in the direction of the flowpath and also rotational movement relative to each other.

Figure 3:
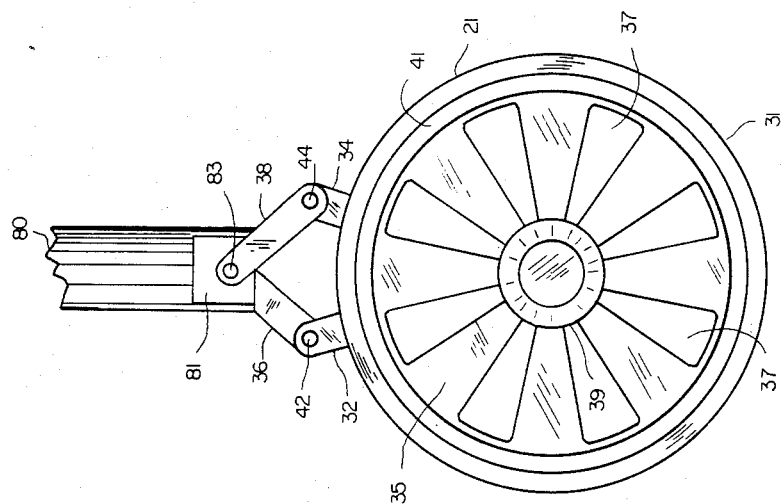
FIG. 3 is a view of the discs and operating mechanism of a throttling valve in accordance with the present invention.

In FIG. 3 the circular configuration of the discs is clearly seen. While only disc 21 is completely visible, it will be understood that disc 20 is substantially the same. Disc 21 includes a plurality of vanes 35 which extend from a central area 39 outwardly toward annular ridge 31 and define generally triangular ports 37. The throttling discs are pictured in the open position. Only disc 21 is visible since corresponding disc 20 is behind disc 21 and ports 37 are completely overlapped. The non-mating surfaces of the disc are conventionally tapered or "streamlined" to reduce turbulence caused by their presence in the flowpath. Both discs are so treated since bidirectional flow is contemplated.

In operation, vertical movement of operating stem 80 results in discs 20 and 21 being rotated relative to each other. In so doing portions of ports 37 in each disc are blocked by portions of vanes 35 in the other disc to close off the port area as a function of movement of the operating stem. In the closed position, the ports in each disc are completely covered by the vanes in the corresponding disc (with approximately one-thirty second inch overlap to assure a good seal) and the flowpath is completely interrupted. In intermediate or throttling positions, the ports are "opened" until the full open position indicated in FIG. 3 is reached at which point the flowpath area is maximized.

It will be appreciated that in a conventional throttling arrangement, the area of the ports is selected to be compatible with the flow rate of the pipeline so that at the open position, the throttling valve will introduce minimum restriction.

It should be particularly noted that the throttling discs are not coupled to each other (except through the toggle links and pin 83), thus eliminating a major source of operating friction. It will also be seen that both discs are movable within the annular races formed by sealing surface 61 and smooth surface 62 of end ring 60, and by sealing surface 71 and smooth surface 72 of end ring 70. In practice the throttling discs are laterally movable between the end rings about 0.01 inches. Those skilled in the art will readily appreciate that this lateral free floating of the discs renders the valve useful in bidirectional flowpaths since flow in either direction results in the discs moving laterally, with the downstream disc being driven into sealing engagement with its corresponding end ring, thus allowing flow only through the ports. If flow is reversed, the discs shift the other way with the downstream disc being driven into sealing engagement with the peripheral sealing surface of the other end ring. Thus surface 61 of end ring 60 seals against outer face 40 of disc 20 for flow to the left and surface 71 of end ring 70 seals against outer face 41 of disc 21 for flow to the right.

In other respects the discs are fabricated along conventional lines with inner faces 22 and 24 being polished to provide a self cleaning action for removing any contaminants which may have lodged thereon. Also, the end rings in the preferred embodiment are retained in position by pressure from flanges 13. The end rings may, however, be mounted differently in the valve body such as by threading, pin and groove locking clips or other well-known arrangements.

While the arrangement described has no elastomers for sealing purposes, thus making the valve very suitable for high temperature use with caustic fluids, it will be seen from FIG. 2 that annular spaces 26 and 28 exist between the front edge of annular ridge 30 of disc 20 and the corresponding end ring sealing surface 61 and between the front edge of annular ridge 31 of disc 21 and end ring sealing surface 71, respectively. Suitable gaskets may readily be installed in these annular spaces on the discs for sealing purposes in some applications.

It will also be appreciated by those skilled in the art that the arrangement of the toggle links allows flexibility in the force required to move the discs. A change in the length of the links in a given valve design will produce a different mechanical advantage for the operating mechanism. While the operating stem is shown to be movable in a rectilinear manner it will also be appreciated that the prior art shows many mechanisms for effecting throttling disc rotation by rotational movement of the operating stem.

Figure 5:
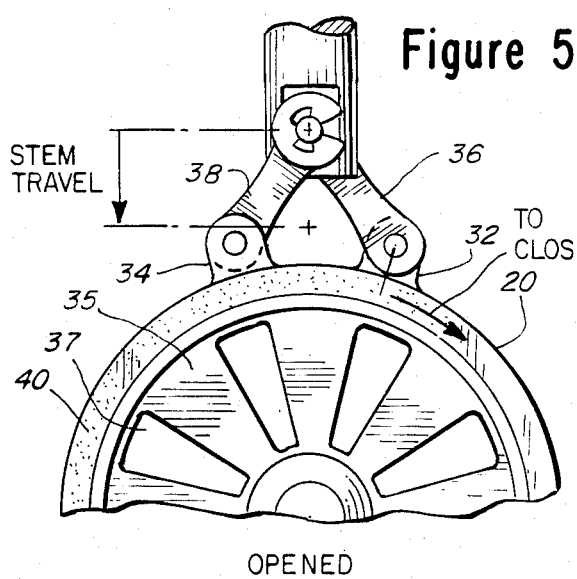
FIG. 5 is a partial view of the operating ears and toggle mechanism showing one position of the operating stem resulting in a valve open condition.
Figure 6:
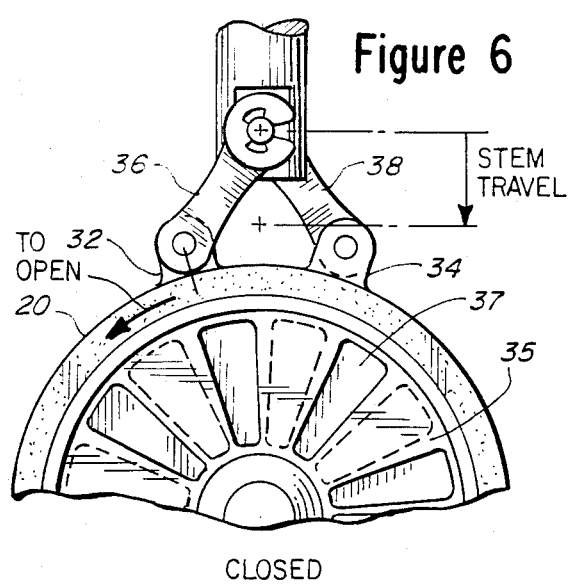
FIG. 6 is a partial view similar to that of FIG. 5 showing the same position of the operating stem resulting in a valve closed condition.

A further feature of the invention will be described in connection with FIGS. 5 and 6. The valve may be arranged for either "stem up" or "stem down" operation, that is either an open or closed valve position may be selected by proper positioning of the discs and toggle links during assembly of the valve. For example, assume an operating stem movement from valve open to valve closed that results in a 15° rotation of each disc. By proper location of the ears and the ports on the discs during manufacture, a reversal of 15° relative rotation will result in an open or a blocked port condition. Thus either condition may be obtained with a given operating stem movement direction by proper placement of the discs and links relative to each other during assembly. FIGS. 5 and 6 illustrate the above conditions.

FIG. 5 represents the open position of the valve with stem 80 up. In response to downward movement of stem 80, disc 20 will rotate clockwise and disc 21 (not visible) will move counterclockwise to close the valve. This is indicated by the arrow labelled "CLOSE". During assembly, however, toggle link 38 and ear 34 need merely be placed in the position of toggle link 36 and ear 32, and vice versa to change the relative rotation direction of the discs for a given stem movement. Thus in FIG. 6, which illustrates a valve closed condition with stem 80 up, downward movement of stem 80 will rotate disc 20 counterclockwise and disc 21 clockwise to open the valve. This is indicated by the arrow labelled "OPEN". Thus, proper positioning of the ears on the discs, bearing in mind the angle of rotation, readily enables achievement of this desirable feature, namely obtaining a given valve condition with a given operating stem position.

What has been described is a novel throttling valve capable of use in high pressure bidirectional flowpaths, which is simple in construction, economical to manufacture and has the potential of excellent reliability.

It is recognized that numerous changes in the described embodiment will be apparent to those skilled in the art without departing from the true spirit and scope of the invention as defined in the claims.

What is claimed is:

1. A throttling valve comprising:
   a body defining a cavity;
   a pair of throttling discs, each defining at least one port, positioned for relative movement in a flowpath for varying the relationship between said port to control flow in said flowpath, said discs each having a smooth surface in wiping contact with each other for assisting in removal of contiminants thereon and each including an ear on the periphery thereof;
   operating means, including an operating stem and a pair of toggle links engaging said ears and said operating stem in a toggle arrangement outside said flowpath, for effecting movement of said throttling discs, said discs being coupled to each other solely through said operating means;
   end bearing means mounted in said cavity and defining a distance between bearing surfaces thereon; and
   said pair of throttling discs having a combined thickness less than the distance between said end bearing surfaces whereby said throttling discs are permitted to move between said end bearing surfaces in the direction of said flowpath.

2. A valve as set forth in claim 1 wherein said drive elements include an ear on the periphery of each disc and wherein said operating means include a pair of toggle links engaging said ears of said discs and said operating stem in a toggle arrangement.

3. A valve as set forth in claim 2 wherein said cavity is cylindrical and wherein said discs are circular and adapted for rotational movement in said bearing means transversely of said flowpath.

4. A valve as set forth in claim 3 wherein the position of said ears on said discs and the size and location of said ports in said discs are such that for a given direction of operating stem movement the valve is opened, the orientation of each disc and its associated toggle link is changeable such that the valve is closed in response to the same direction of operating stem movement.

5. A throttling valve adapted for use in a high pressure bidirectional flowpath comprising:
   a cylindrical valve body defining a cavity;
   a pair of circular throttling discs, each defining at least one port, positioned in said cavity for relative rotational movement for varying the relationship between the ports to control flow in said flowpath;
   an operating stem movably mounted in said body;
   toggle means coupled between said operating stem and said discs for translating rectilinear movement of said stem into rotational movement of said discs, said operating stem and said toggle means being located outside said flowpath; and
   two end bearing members in said cavity supporting said discs, the distance between said end bearing members being greater than the combined thickness of said discs to permit lateral movement of said discs in the direction of said flowpath.

6. A valve as set forth in claim 5 further including;
   a pair of circular end rings in said body, said bearing members being formed by annular surfaces in said end rings.

7. A valve as set forth in claim 6 wherein said end rings further include sealing surfaces adapted for sealing engagement with the outer faces of said discs.

* * * * *